US010223663B2

(12) United States Patent
Cash

(10) Patent No.: US 10,223,663 B2
(45) Date of Patent: Mar. 5, 2019

(54) DISCRETE-EVENT SIMULATION FOR TRANSACTION SERVICE POINT DEVICE CASH SERVICING

(71) Applicant: NCR Corporation, Duluth, GA (US)

(72) Inventor: Charles Robert Cash, New Albany, OH (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/664,851

(22) Filed: Jul. 31, 2017

(65) Prior Publication Data

US 2019/0034842 A1 Jan. 31, 2019

(51) Int. Cl.
*G06K 15/00* (2006.01)
*G06Q 10/06* (2012.01)
*G06Q 20/18* (2012.01)
*G07F 7/04* (2006.01)
*G07G 1/00* (2006.01)

(52) U.S. Cl.
CPC ........... *G06Q 10/067* (2013.01); *G06Q 20/18* (2013.01); *G07F 7/04* (2013.01); *G07G 1/0009* (2013.01)

(58) Field of Classification Search
CPC .... G06Q 10/067; G06Q 20/18; G07G 1/0009; G07F 7/04
USPC ........................................................ 235/383
See application file for complete search history.

(56) References Cited

U.S. PATENT DOCUMENTS

| 5,799,288 | A  | * | 8/1998  | Tanaka  | G06Q 20/108 705/42 |
| 6,378,770 | B1 | * | 4/2002  | Clark   | G07D 11/0057 235/379 |
| 7,545,816 | B1 | * | 6/2009  | Coutts  | G06Q 20/1085 235/375 |
| 7,559,461 | B2 | * | 7/2009  | Crowell | G06Q 20/10 235/379 |
| 8,459,540 | B2 | * | 6/2013  | Brindley| G06Q 10/06 235/375 |
| 8,800,864 | B2 | * | 8/2014  | Graef   | G07F 19/203 235/379 |
| 9,779,588 | B2 | * | 10/2017 | Angus   | G07F 19/204 |

\* cited by examiner

*Primary Examiner* — Thien M Le
(74) *Attorney, Agent, or Firm* — Schwegman, Lundberg & Woessner

(57) ABSTRACT

The various embodiments herein each include at least one of systems, methods, and software for discrete-event simulation for transaction service point device cash servicing, such as SSTDs. Such embodiments provide a unique, completely different analytic approach, and predicts a more detailed set of intractable insights for efficient servicing cash needs of SSTDs. One example embodiment in the form of a method includes receiving cash state data from an SSTD into an SSTD cash state simulator and applying a set of simulated input demand sequence data to the cash state data to obtain outputs over a simulated period. This method, while executing tracks a simulated cash state of the SSTD from which the SSTD cash state data was received over the simulated period to identify SSTD servicing needs. The method then stores the identified SSTD servicing needs in an SSTD management module.

18 Claims, 4 Drawing Sheets

DISCRETE-EVENT SIMULATION FOR TRANSACTION SERVICE POINT DEVICE CASH SERVICING

BACKGROUND INFORMATION

Institutions, including retail and financial institutions, operating devices containing cash, such as automated teller machines (ATMs), self-service checkout (SSCOs) terminals, and even some gaming machines and expensive-item vending machines, have been faced with several difficulties in managing cash in these service point devices. Such cash containing devices may be generally referred to herein as self-service transaction devices (SSTDs). These difficulties may include ensuring a device has adequate cash to service customers' needs as well as reducing costs associated with removing and replenishing cash via employee, or third party, interactions. Often, institutions have developed cash management strategies including, for example, auditing the cash in the devices weekly, daily, or more often. Frequent auditing is often performed to reduce costs associated with theft, or human errors, as well as to remove excess cash in a device not required to service customers; thus, deploy excess cash more productively. Further, replenishment of cash within the cash devices, is often carried out on a schedule, and to an amount, dictated by industry norms for a given institution, device location, and device type (e.g., a self-checkout register or bank automatic teller machine). Variations to these norms, for example, replenishing a given device more often, regularly occur through trial and error which may also increase costs. Therefore, managing cash in these service point devices is often an expensive, time consuming process, and a challenging problem for an institution to determine the best cash management strategy.

SUMMARY

The various embodiments herein each include at least one of systems, methods, and software for discrete-event simulation for transaction service point device cash servicing, such as SSTDs. Such embodiments provide a unique, completely different analytic approach, and predicts a more detailed set of intractable insights for efficient servicing cash needs of SSTDs. Such embodiments may not only provide insight and direction on when to service cash needs of SSTDs, but also individual note needs in terms of quantity, a type of service needed such as a topping up of a particular currency note-type or a full reset of a currency state. Some embodiments may execute in or near real-time based on live SSTD transactional data. However, other embodiments may be executed periodically or on demand as needed against recent historical data to identify a periodic schedule for when one or more SSTDs should be serviced to optimize one or more factors, such as cost, minimizing downtime, maximizing opportunity costs and savings from servicing personnel that may be in proximity servicing other SSTDs, and other factors.

One example embodiment in the form of a method includes receiving cash state data from an SSTD into an SSTD cash state simulator and applying a set of simulated input demand sequence data to the cash state data to obtain outputs over a simulated period. This method, while executing tracks a simulated cash state of the SSTD from which the SSTD cash state data was received over the simulated period to identify a time when the SSTD will need service and a service-type. The method then stores the identified time and service-type when the SSTD will need service in an SSTD management module.

Another method embodiment includes applying a set of simulated input demand sequence data to simulated cash state data that simulates an evolution of cash state data of a self-service transaction device SSTD over a period to obtain simulated outputs over the simulated period that are utilized to update the simulated cash state data of the SSTD. This method may then also store a simulated time and needed service-type when the SSTD will need service in an SSTD management module.

Yet a further embodiment, this time in the form of a system, includes at least one SSTD. Each of these SSTDs includes a repository to hold currency. The system further includes at least one hardware processor on which an SSTD management module executes to perform data processing activities. The data processing activities may include applying a set of simulated input demand sequence data to simulated cash state data that simulates an evolution of cash state data of an SSTD over a period to obtain simulated outputs over the simulated period that are utilized to update the simulated cash state data of the SSTD. The data processing activities further include storing a simulated time and needed service-type when the SSTD will need service in an SSTD management module.

DETAILED DESCRIPTION

Figure 1:
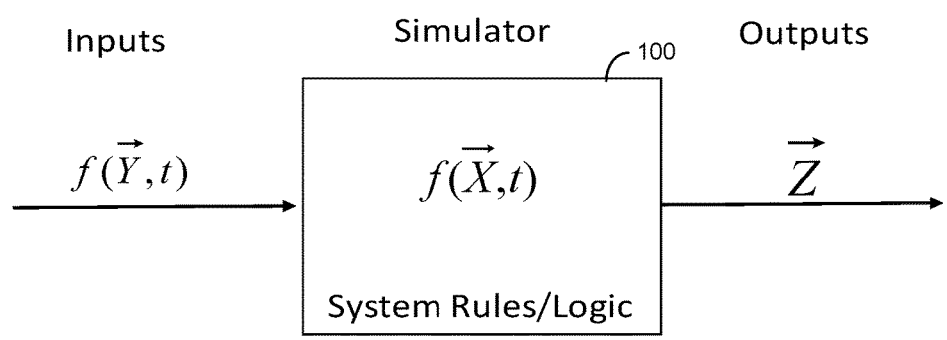
FIG. 1 illustrates an example embodiment of a simulator, according to an example embodiment.

The various embodiments herein each include at least one of systems, methods, and software for discrete-event simulation for transaction service point device cash servicing, such as SSTDs. Such embodiments provide a unique, completely different analytic approach, and predicts a more detailed set of intractable insights for efficient servicing cash needs of SSTDs, for example over the inventor's previous work in U.S. Pat. No. 8,639,594 entitled "CASH MANAGEMENT OF SELF-SERVICE TRANSACTIONAL DEVICES". The methodology of this prior effort includes a mathematical optimization approach that defines the total cost of managing cash at a SSTDs as an equation involving replenishment cost, cash demand, and holding cost and used classic mathematical techniques to calculate the optimal answers to key questions, up to the fidelity of the model. An example of those questions includes:

1. What is the reset (or initial loan) level of cash by denomination?
2. When should an institution replenish cash at a self-service device?

While this optimization approach has helped major institutions save millions of dollars by better managing cash at SSTDs, in practice and with technological advances, additional confounds have been encountered that are beyond the fidelity of prior approaches. These newly encountered confounds call for a different modeling solution to estimate answers to more detailed questions, such as:

1. What is the probability of running out of certain notes or coins, between cash reset or audit events?
2. What is the likelihood of one or more devices requiring "top offs" (i.e., adding monies of a certain denominations before scheduled reset or audit events) per time period, e.g., a day?
3. What are the quantities by denominations for a typical "top off", so an institution can prepare when it occurs so that the event is less disruptive to the institution's customers and associates?

To predict answers to these detailed system questions and to service SSTDs, the embodiments herein provide a robust approach to model the underlying stochastic process of such systems with cash in-flows and out-flows at a cash service point device. Such embodiments include use of a simulation approach to represent the discrete sample paths of these types of systems.

The relevancy of this methodology and embodiments herein is quite timely, for example, as hundreds of retailers begin to refresh tens of thousands deployed SSTDs, such as accept-dispense self-checkout registers with full cash recycling units where the various norms of the institution's cash management strategies are no longer applicable. The following example is an illustration of this value.

In a recent research study, an estimated cost of managing cash for self-service checkout (SSCO) in a store with 8 SSCO lanes was approximately $17,200 per year. The retailer's cash management policy in this study was to replenish, balance, and reconcile cash at each SSCO lane daily and used a common (but somewhat arbitrary) reset balance of $2,000 per lane (broken down into specific quantities of coins and bills). With this reset balance amount the retailer rarely, if ever, had to audit or reset a SSCO lane between scheduled resets. The estimated time required to replenish (and reset) cash at a SSCO lane was, on average, about 5 minutes per lane. The estimated time to perform an unscheduled audit (or "top-off" monies at a lane) was 10 minutes per lane. The additional time required for unscheduled audit was due to securing monies for an additional SSCO lane loans. For control and security purposes, the retailer requires two associates, typically a cash office associate and a store front-end manager, to perform the lane replenishment task. The average loaded hourly labor cost for these associates was approximately $15 per hour.

Currently, the retailer is beginning to refresh SSCO lanes with SSCO cash recycler lanes. The retailer decided to reduce the reset balance in these lanes to $550 per lane, based on advice of the vendor. After several weeks of operating, the retailer was finding they had to perform four or more audits to replenish cash at each SSCO per day (or worse the retailer turned lanes into card only mode impacting customer experience). These four additional audits per day were costing an additional $20 per day or $7,300 per store per year. Extending this example further, what if this retailer had 4,000 similar stores with 8 SSCO lanes per store, then the annual enterprise SSCO cash management cost with these unscheduled audits would be approximately $29.2 million ($7,300×4000).

A preliminary analysis using the concepts and embodiments presented herein resulted in a policy to replenish SSCO lanes daily and a reset balance of $855 (distributes appropriately in quantities of coins and bills). The estimated annual cost of managing cash at SSCO if this store used this new policy would be $4,100 (a savings of $3,200 per year). If this retailer had 4,000 similar stores with 8 SSCO lanes per store, then the annual enterprise SSCO cash management cost using this new policy would be $16.4 million, or a savings of $12.8 million per year over the retailer's current cash management policy. Considering the cost savings at scale for large retailers, the embodiments presented herein provide an important advancement for enhancing customer experiences and freeing teller personnel to provide greater customer assistance in the aisles while also increasing retailer competitiveness and profitability.

Note that the SSTDs herein, while at times referred to as SSCOs and ATMs, the embodiments herein are also relevant to other types of SSTDs. Such other types of SSTDs, may include kiosk devices, such as airline checking and boarding pass kiosks where additional payments may be made for things such as luggage, seat upgrade, change fee, and prepaid expense fees (e.g., for airborne Internet access and other amenities). Other kiosk devices may include restaurant ordering kiosks, public transportation ticket purchase/payment kiosks, theater ticket kiosks, and others.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 illustrates an example embodiment of a simulator 100, according to an example embodiment. The simulator 100 of FIG. 1 is illustrated as an equation representing states of cash by denomination in one or more SSTDs. For example, a state of cash at a cash dispense ATM may be 500, $20 notes and 200, $10 notes, denoted by an array (200, 500) for $10 and $20 notes, respectively. Then, one can utilize the illustrated simulator 100 including device system rules or logic to model a deterministic sequence of transaction log data on cash flow from one or more SSTDs or a stochastic sequence of cash transactions representing cash inputs and outputs to a device. The simulator 100 allows for determining, with a sufficiently accurate probability, not only when an SSTD will need currency servicing, but also what the needs will be and whether that service is a topping off of certain currency note type or types, a complete reset. Such embodiments are also able to take into account in simulations whether all currency of particular denominations will be available for dispensing based on system rules and logic in the simulator 100 that take into account SSTD properties, limitations, environmental parameters, and the like (e.g., currency-type storage limitations that would cause an excess of certain currency-type bills to be stored in a dump bin, accessible hours to take into account hours when the SSTD is accessible to customers, etc.).

To illustrate this simulation of simulator 100 in FIG. 1, a function $f$ is defined to represent the state of cash in a cash service point device, i.e., an SSTD. The function $f$, be presented as:

$$f(\vec{X}, t) \quad \text{(equation 1)}$$

Where the variables represent the following:

$\vec{X} = \{X_1, X_2, \ldots, X_m\}$ where $X_i$ represent the counts of cash by denomination, i=1, 2, ..., M. (where M represents the number of cash denominations for 1 or more currencies). For example, an SSTD in the US, $X_1$ may represent the count of $0.01, $X_2$ represents the count of $0.05, ..., $X_{13}$ represents the count of $100.00 notes in a self-checkout device.

Note: the size of $X_i$ (e.g., i=13 for self-checkout in US currency) and the values $X_i$ represents can be generalized to represent any types of cash service point devices. For example, a device with cash recycling, as well as different currencies. Also, one can easily expand the logic of $X_i$ to be two dimensional-variable, where the second dimension allows representation for multiple devices t=time, for example, 0:45:01 (hh:mm:ss)

With this understanding, the simulator 100 of FIG. 1 is presented, where:

$f(\vec{Y}, t) = \{Y_1, Y_2, \ldots, Y_n\}$ where $Y_j$ represent input data containing demand sequence, sample path of cash transactions for j=1, 2, ..., N. For example, for a self-checkout device, $Y_1$ may represent an acceptance of a $20 note cash input for payment of a purchase of $14.90 of items and dispense, a cash output, of $5.10 in change. A representation of this example may look like an array containing the values (+$20, −$5, −$0.10). This demand sequence can be generated either deterministically (via, a device historical transaction log or stochastically (via, demand sequence probability distributions).

t=time when the event occurs $\vec{Z} = \{Z_1, Z_2, \ldots, Z_k\}$ where $Z_k$ represent output data containing states of K performance metrics data for k=1, 2, ..., K. For example, $Z_1$ may represent the number of occurrences where $1 notes went to 0 at a device. One can expand the output data set to include multiple performance metrics and multiple devices.

A cash service point device may have separate storage locations for monies accepted and dispensed. In some instances, storage of monies accepted and dispensed can be combined into cash recycler units. A service point device may contain multiple recyclers in the same device, to recycle monies by denominations, e.g., recyclers for $1, $5 and $20 notes. An example of system logic maybe to represent the fixed capacity (i.e., maximum # of bills) of a note recycler before additional notes of the same denomination, e.g., $20 bills, are stored in a cash box (i.e., dump bin) and not available to recycle (dispense to a customer). Thus, when the subject SSTD includes currency recycling, a further variable may be tracked by the simulator 100 with regard to currency notes when a certain currency denomination bin is full, such as for $20 bills, and further $20 bills are received. The further variable is utilized in such embodiments to track those $20 bills that are present in the SSTD but not available for recycling. To facilitate this additional variable, system rules and logic of the simulator may be added to the simulator 100, such as by hard coding, coding in a modeling language that is understood by a simulation engine of the simulator 100, or otherwise. Such coding and modeling allows for customization to the particular SSTD-types of particular deployments and embodiments.

The simulator 100 of FIG. 1 can be implemented for SSTD where storage of cash for dispensing (output) are separate from storage of cash for accepting (input), i.e., cash accept-dispense devices, as well as devices that combine storage of inputs and outputs of cash in devices, i.e., cash recycling devices. Additionally, such embodiments can be automated by developing the simulator 100 within a software package or as part of a standalone solution, such as on or within a self-service transaction device management module 203 as illustrated in FIG. 2.

In some embodiments, the simulator 100 executes to determine when an SSTD is likely to need servicing. Some embodiments also execute to determine what the servicing needs for the SSTD will be at a finer granularity, such as what currency notes will be needed and how many, whether a currency dump bin will be full, and the like. In some embodiments, the simulator 100 may also take into account other consumable items of the SSTD, such as receipt paper, airline ticket or boarding pass printing paper or other material, postage stamp printing media, and the like, depending on the type of the SSTD and what the servicing needs may be. The simulator 100, in some embodiments, may also simultaneously simulate a set of SSTDs that are co-located to take into account a larger amount of SSTD use demand, potential servicing needs of a multiple SSTDs, and coopting servicing needs of the co-located set of SSTDs to minimize a number of servicing trips and optimize other factors as may be present in certain instances.

In some embodiments, the simulator 100 may also take into account additional information when executing. This additional information may include a time of year, such as a holiday shopping season where servicing needs may be greater due to higher SSTD use demand or even a day of the week (e.g., Fridays) or certain days of the month (e.g., to account for payday and government benefit payment days). This additional information may be taken into account by the simulator 100 on a periodic basis as may be dictated by the information-type or may be taken into account as different currency policies that may be available or may be developed by the simulator 100. These different cash policies allow for modification of currency denomination bill types, number of each denomination bill, servicing types (e.g., reset, top-off, recycling, etc.)

Figure 2:
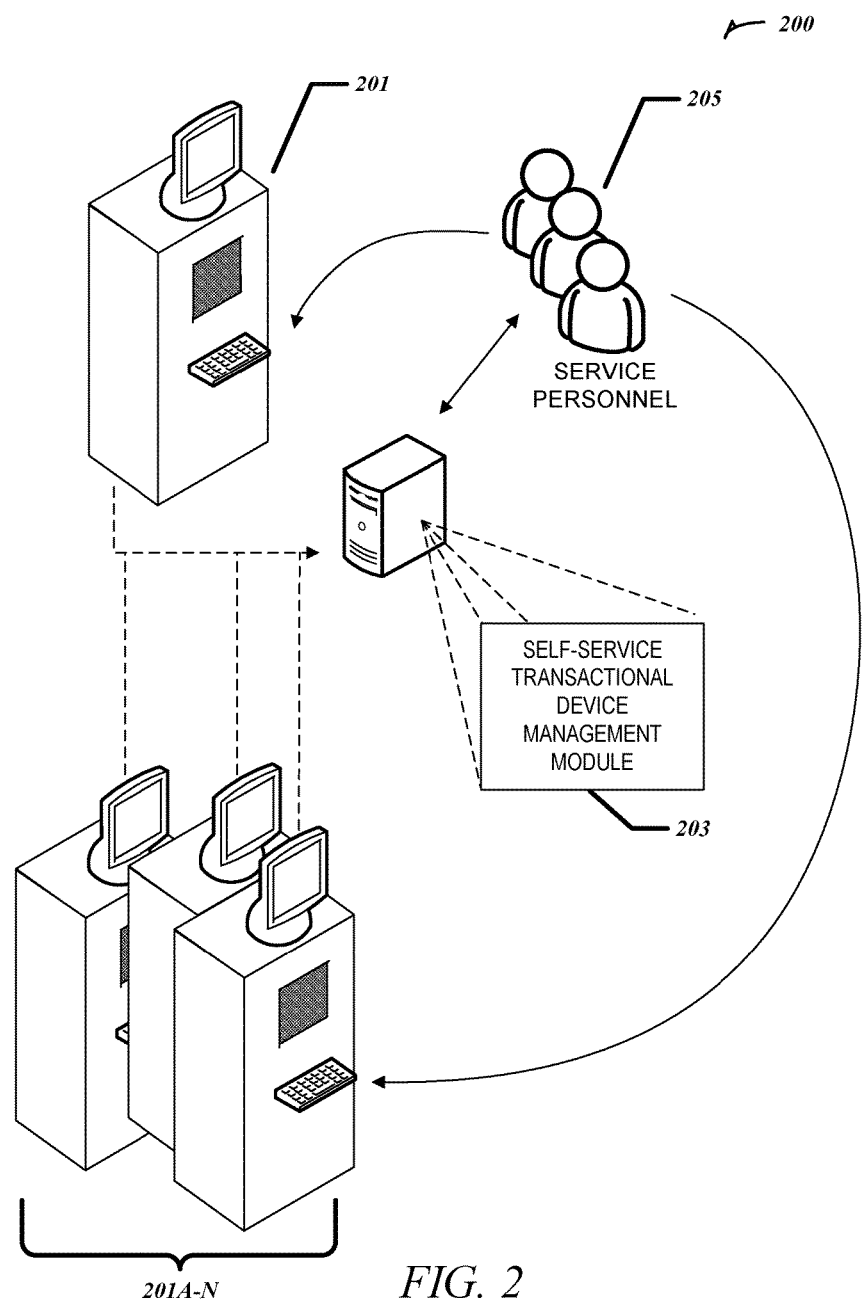
FIG. 2 is a block diagram illustrating an example system for cash management of self-service transaction devices, according to an example embodiment.

FIG. 2 is a block diagram illustrating an example system 200 for cash management of self-service transactional devices according to one embodiment. System 200 may include one or more SSTDs 201, 201A-N, and a self-service transaction device management module 203 ("SSTD management module"). The SSTDs 201, 201A-N may be serviced by service personnel 205.

SSTDs 201, 201A-N may be several different types of devices, such as ATMs, self-service checkout ("SSCO") terminals, or item dispenser devices, for example. However, SSTDs 201, 201A-N, for the purposes herein, fall into one of four categories: dispense only devices; dispense and deposit devices; dispense and deposit devices with cash recycling; and deposit only devices. In some examples, the SSTDs 201, 201A-N may be grouped according to device category. In some examples, a common cash reset value and associated interval are applied to SSTDs 201, 201A-N. In some examples, each of SSTDs 201, 201A-N, have a separate cash reset value and associated interval applied. In some examples, SSTDs 201, 201A-N, optionally configured to report various metrics pertaining to cash flow data in response to an event. In some examples the event may include receiving a report request, arrival of a predetermined reporting period (e.g., at the end of a day or month), the cash repository has filled (e.g., in the cash of a deposit category device), or the repository has emptied. In some examples, SSTDs 201, 201A-N may be communicatively coupled to the SSTD management module 203, via, for example, the internet, a cellular network, or other communications mechanisms, to report the various metrics directly to the SSTD management module 203.

The SSTD management module 203 may be configured to receive cash flow data, cash holding cost data, cash service cost data associated with the SSTDs 201, 201A-N, and other data that my include data derived from local simulation or simulation performed on another computing device according to the simulator 100 of FIG. 1 or other simulator. In some examples, the SSTD management module 203 may include one or more user or programmatic interface to receive, calculate, or a combination of receive and calculate the data. In some examples, the SSTD management module 203 may include a retrieval service configured to connect to external data sources in order to obtain at least of portion of the cash flow data, cash holding cost data, cash service cost data, and simulation data.

In some examples, SSTD management module 203 may also include one or more output interfaces to help direct the service personnel 205. For example, the SSTD management module 203 may include a user interface indicating a schedule of when to service each SSTD 201 or a group of SSTDs 201A-N. In some examples, the SSTD management module 203 may include a communications module to communicate the optimization data to an external system (e.g., a work order scheduling system) to direct the service personnel 205. Some embodiments may also or alternatively, communicate determined SSTD servicing needs to service personnel 205 via email, text messages, in-app messages, automated telephone calls, voice mail, and the like. By following the direction provided by the SSTD management module 203, service personnel 205, and thus an institution, may reduce costs associated with managing SSTDs and decrease SSTD downtime.

Figure 3:
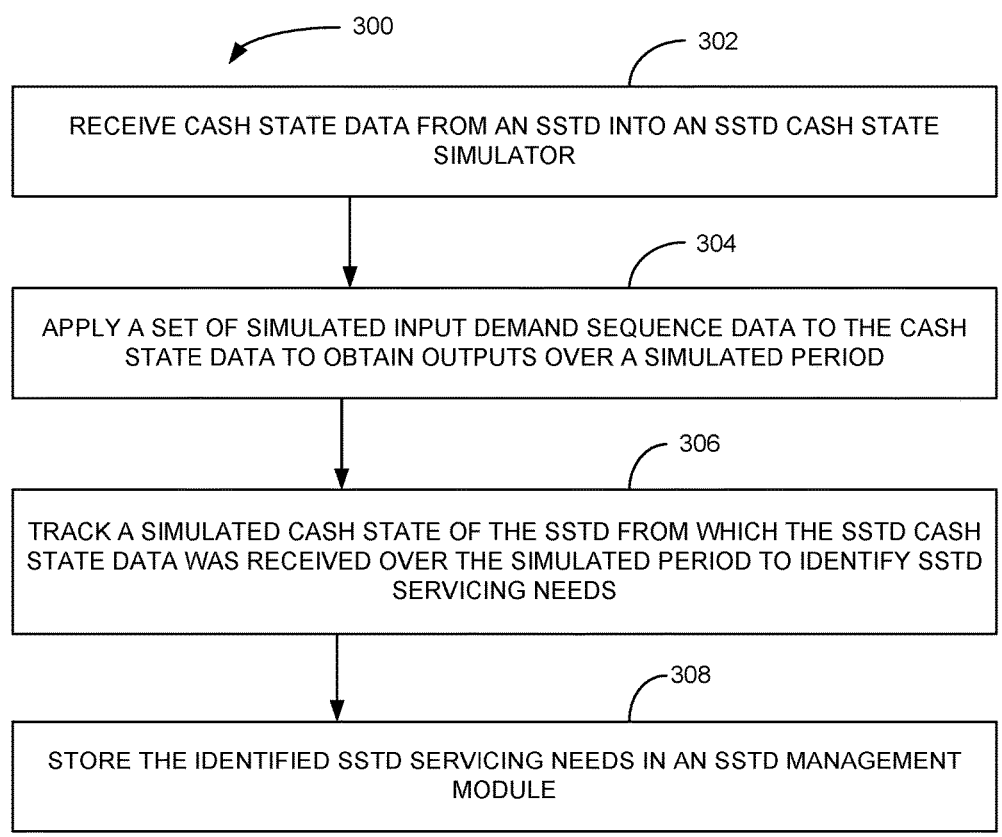
FIG. 3 is a block flow diagram of a method, according to an example embodiment.

FIG. 3 is a block flow diagram of a method 300, according to an example embodiment. The method 300 is an example method of a method that may be implemented on a self-service device management module 203 as illustrated in FIG. 2 or elsewhere to simulate cash states on SSTDs.

The method 300 includes receiving 302 cash state data from an SSTD into an SSTD cash state simulator and applying 304 a set of simulated input demand sequence data to the cash state data to obtain outputs over a simulated period. The period may be a number of minutes, hours, and even days or weeks. The method 300 further includes tracking 306 a simulated cash state of the SSTD from which the SSTD cash state data was received over the simulated period to identify a time when the SSTD will need service and storing 308 the identified time when the SSTD will need service in an SSTD management module. The SSTD, in various embodiments, may be a self-service checkout terminal, an ATM, or other terminal.

In some embodiments of the method 300, the cash state data received 302 from the SSTD is received as a dataset of a set of values of each currency denomination maintained by the SSTD. In some such embodiments, the simulated input demand sequence data that is applied 304 is processed in view of the cash state data to simulate transactions conducted on the SSTD and how those transactions modify the cash state of the SSTD with regard to each denomination maintained by the SSTD in obtaining the outputs over the simulated period. In one such embodiment, the set of input demand includes input of currency of at least one denomination. The SSTD in such an embodiment may include currency recycling that enables outputting currency received as input. The simulated cash state of the SSTD may then take into account currency received as input when identifying the time when the SSTD will need service.

Figure 4:
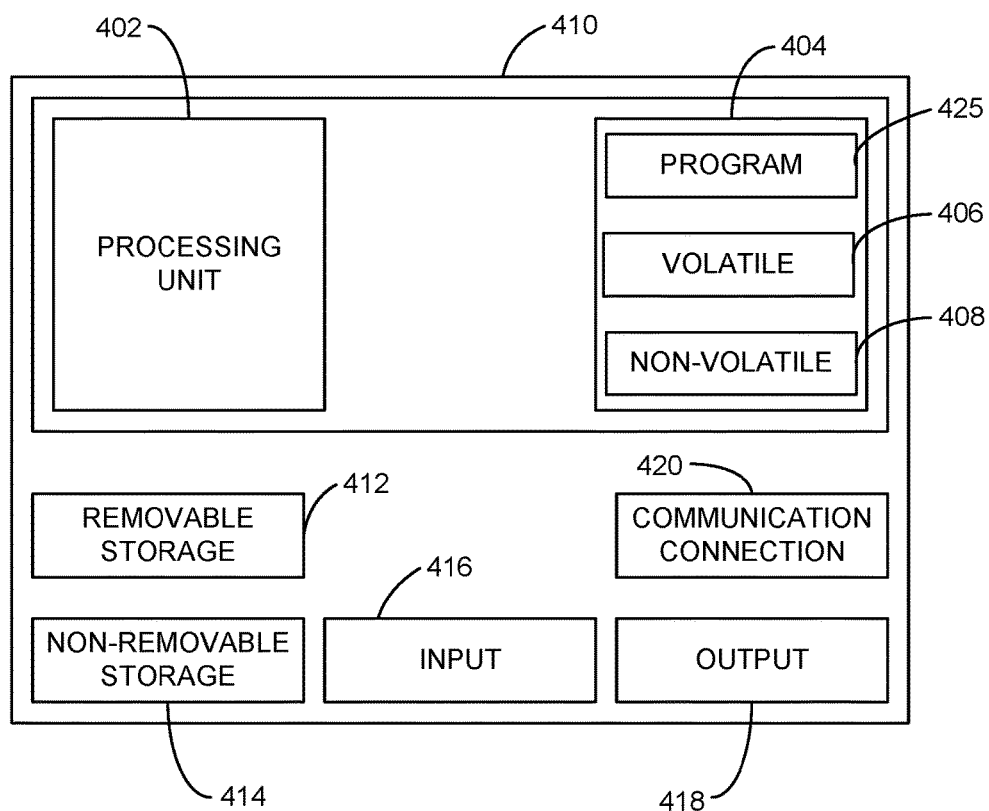
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, solid state drive, CD-ROM, and RAM are some examples of articles including a non-transitory computer-readable medium. For example, a computer program 425 capable of performing one or more of the methods herein for controlling operation of an SSTD.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
receiving cash state data from a self-service transaction device (SSTD) into an SSTD cash state simulator;
applying a set of simulated input demand sequence data to the cash state data to obtain outputs over a simulated period, wherein the simulated input demand sequence data is processed in view of the cash state data to simulate transactions conducted on the SSTD and how those transactions modify the cash state of the SSTD with regard to each denomination maintained by the SSTD in obtaining the outputs over the simulated period;
tracking a simulated cash state of the SSTD from which the SSTD cash state data was received over the simulated period to identify SSTD servicing needs; and
storing the identified servicing needs of the SSTD in an SSTD management module.

2. The method of claim 1, wherein the SSTD is a self-service checkout terminal.

3. The method of claim 1, wherein the cash state data received from the SSTD is received as a dataset of a set of values of each currency denomination maintained by the SSTD.

4. The method of claim 1, wherein the set of input demand includes input of currency of at least one denomination.

5. The method of claim 4, wherein the SSTD includes currency recycling that enables outputting currency received as input, the simulated cash state of the SSTD taking into account currency received as input when identifying the time when the SSTD will need service.

6. The method of claim 1, further comprising:
generating and providing a service notification message to update a servicing schedule for the SSTD.

7. The method of claim 1, wherein identifying the servicing needs of the SSTD includes:
identifying when an amount of a currency-type maintained by the SSTD reaches a level that would prevent servicing of transactions conducted on the SSTD.

8. A method comprising:
applying a set of simulated input demand sequence data to simulated cash state data that simulates an evolution of cash state data of a self-service transaction device (SSTD) over a period to obtain simulated outputs over the simulated period that are utilized to update the simulated cash state data of the SSTD, wherein the simulated input demand sequence data is processed in view of the cash state data to simulate transactions conducted on the SSTD and how those transactions modify the cash state of the SSTD with regard to each denomination maintained by the SSTD in obtaining the outputs over the simulated period; and
storing a simulated servicing need of the SSTD in an SSTD management module.

9. The method of claim 8, wherein the simulated servicing need of the SSTD includes at least one of:
a time or frequency at which the SSTD will need servicing;
at least one currency-type and an amount of the respective currency-type that will be needed;
a need for a full SSTD reset; and
a need for an SSTD audit.

10. The method of claim 9, wherein the set of input demand includes input of currency of at least one denomination.

11. The method of claim 10, wherein the SSTD includes currency recycling that enables outputting currency received as input, the simulated cash state of the SSTD taking into account currency received as input when identifying the time when the SSTD will need service.

12. The method of claim 8, wherein the cash state data received from the SSTD is received as a dataset of a set of values of each currency denomination maintained by the SSTD.

13. The method of claim 8, further comprising:
generating and providing a service notification message to update a servicing schedule for the SSTD.

14. The method of claim 8, further comprising:
generating and providing a service notification message to initiate servicing of the SSTD.

15. A system comprising:
at least one self-service transaction devices (SSTD), each SSTD including a repository to hold currency;
at least one hardware processor;
an SSTD management module that executes on the at least one hardware processor to perform data processing activities comprising:
applying a set of simulated input demand sequence data to simulated cash state data that simulates an evolution of cash state data of a SSTD over a period to obtain simulated outputs over the simulated period that are utilized to update the simulated cash state data of the SSTD, wherein the simulated input demand sequence data is processed in view of the cash state data to simulate transactions conducted on the SSTD and how those transactions modify the cash state of the SSTD with regard to each denomination maintained by the SSTD in obtaining the outputs over the simulated period; and
storing a simulated servicing need of the SSTD in an SSTD management module.

16. The system of claim 15, wherein at least one of the SSTDs includes a currency recycler, the simulation of the evolving cash state data taking into account currency received as input in simulating the output cash state data that is updated.

17. The system of claim 15, wherein the at least one SSTD includes at least one self-service checkout terminal.

18. The system of claim 17, wherein the SSTD further includes at least one automated teller machine.

* * * * *